United States Patent Office 3,443,418
Patented May 13, 1969

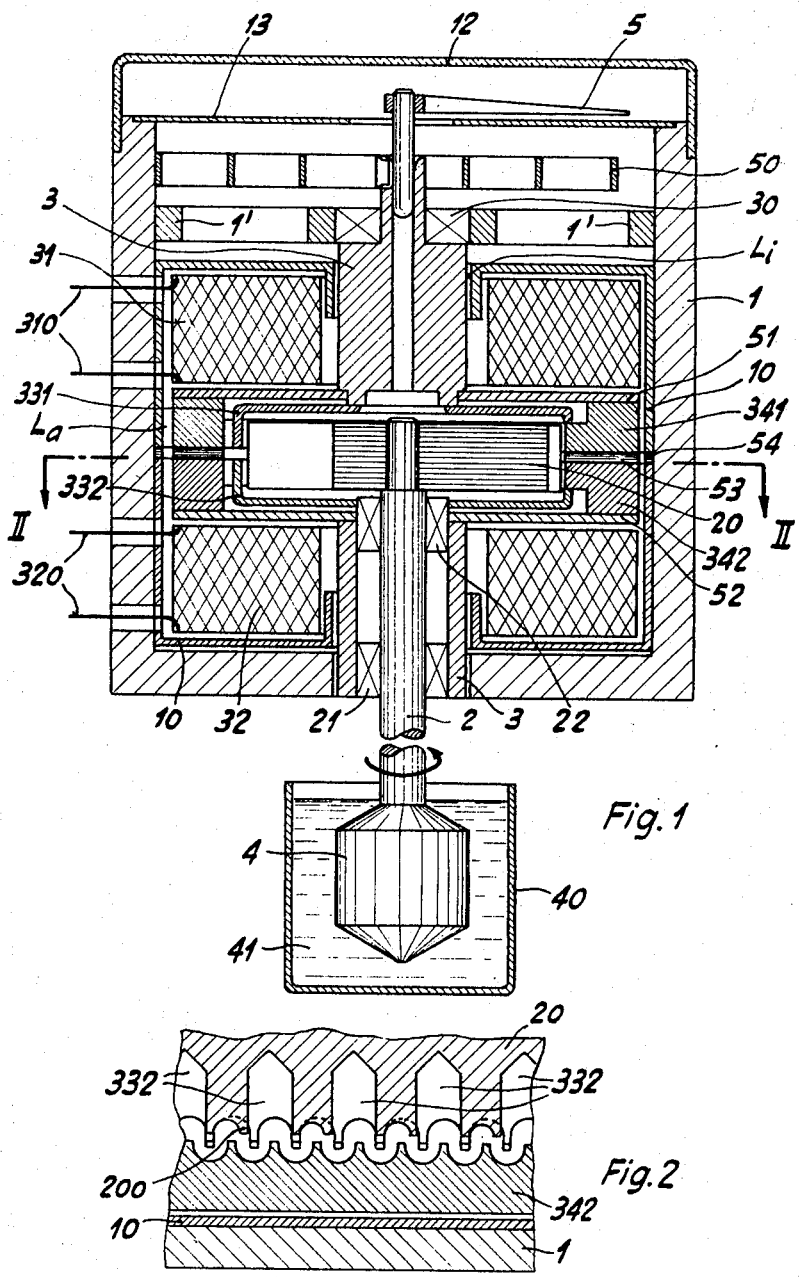

3,443,418
BRAKING TORQUE SENSING MEANS
Kurt Tschudin, Zurich, Switzerland, assignor to Contraves A.G., Zurich, Switzerland
Filed Sept. 30, 1966, Ser. No. 583,406
Int. Cl. G01n 11/00
U.S. Cl. 73—59                                    10 Claims

ABSTRACT OF THE DISCLOSURE

A device for measuring the braking torque applied by a medium, and thereby measure the viscosity of the medium. A rotor and a stator are linked through a magnetic field established by a stationary coil. A sensing head is secured to the rotor and measures the braking torque which may be applied when the sensing head is immersed in the fluid which is the subject of the viscosity measurement. The stator is displaced against the action of a spring, as a function of the braking moment. An indicator attached to the stator rotates with it and indicates directly the braking moment which may be calibrated in terms of viscosity units. Power leads applying current to the stationary coil are entirely fixed in space.

---

The present invention relates to a device applicable, in particular, to the measurement of the viscosity of fluids.

Heretofore, devices for measuring the viscosity of fluids were comprised of electrical rotor and stator arrangements wherein the excitation current for the device had to be transmitted through flexible leads and connections. Thus, the portion of the excitation leads adjacent to the device moved under normal application conditions thereof. Since the excitation leads originated from a fixed power supply, they had to be constructed in flexible form so as to allow for the movable action at the measuring device. These flexible excitation leads introduced errors into the measuring process, due to the forces exerted by the leads upon the body of the viscosity measuring device.

Accordingly, it is an object of the present invention to provide a device for measuring the viscosity of fluids, whereby no errors are introduced into the measuring process due to excitation leads connected to the device.

Another object of the present invention is to provide a device for measuring the viscosity of fluids, of the character described, which operates on the basis of a rotor-stator arrangement having excitation leads that remain fixed during the operation of the device.

A further object of the present invention is to provide a viscosity measuring device, as set forth, which is simply constructed, accurate in measurement, and reliable in operation.

With the preceding objects in view, the present invention includes a rotor of a synchronous motor having a shaft rotatable within the shaft of a stator. Secured to the rotor shaft, is a sensing head for acquiring the data essential to the measuring process. When the sensing head is immersed in a fluid for purposes of measuring the viscosity thereof, for example, a braking torque will be applied by the fluid to the sensing head. The excitation windings associated with the synchronous motor produce a magnetic field linking the rotor and the stator. Both the rotor and stator are provided with cooperating pole pieces through which the magnetic flux passes. As a result of this magnetic path, the braking torque applied to the rotor shaft is reflected in a torque applied to the stator, with the excitation coils remaining fixed in space. The stator has an indicator secured to it, which moves along a scale calibrated in terms of the quantity measured. When the measured parameter is viscosity, the scale can be calibrated directly in units thereof. Depending upon the viscosity of the fluid in which the sensing head is immersed, a greater or smaller torque is applied to the sensing head and hence to the rotor shaft. This applied torque to the rotor, functions as a retarding or braking torque which, when transmitted to the stator via the magnetic path, the viscosity of the fluid may be read directly from the scale by noting the position of the indicator thereon.

The novel features which are considered as characteristic of the invention are set forth in particular in the appended claims. The invention itself, however, both as to its construction and its method of operation together with additional objects and advantages thereof, will be best understood from the following description of specific embodiments when read in connection with the accompanying drawings in which:

FIG. 1 is a cross-sectional plan view through the rotational axis of the device, and shows the construction and relative positions of the operating parts of the device; and FIG. 2 is a fragmentary cross-sectional view taken along line II—II in FIG. 1, and shows the pole-pieces associated with the rotor and stator of the measuring device.

Referring to the drawing, the motor housing 1 supports the coaxially mounted motor shaft 2 and stator shaft 3. The rotor 2 is held or supported within bearings 21 and 22 situated within the stator shaft 3. The stator shaft 3, on the other hand, is supported by bearings 30 mounted within the member 1' fixed to the housing. The rotor shaft 2 is secured to a motor structure 20 corresponding to a synchronous motor. An interchangeable rotational body 4 is mounted to the output or cantilevered end of the shaft 2. The rotational body 4 is immersed in a fluid 41 confined within the container 40, and serves as the viscosity-measuring sensor of the fluid.

The excitation coils 31, and 32 of the synchronous motor are mounted within a coil housing 10 constructed of a ferromagnetic material. The coil housing 10 is secured to the main housing 1. The leads 310 and 320 of the excitation coils 31 and 32 respectively, can therefore pass out of the housing to fixed connectors. Thus, leads 310 and 320 are fixed in space during normal operation of the device. Accordingly, the leads 310 and 320 may be readily and conveniently connected to a power supply for energizing the coils 31, and 32.

The stator shaft 3 carries internal bearings 331 and 332 which are shaped in the form of pole pieces, as shown in FIG. 2, along their circumferences. The stator shaft 3 and the internal bearings 331 and 332 are all made of ferromagnetic material.

External stator rims 341 and 342 are, similarly, shaped in the form of pole-pieces, according to FIG. 2, at their inner surfaces. The pole pieces associated with the stator rims 341 and 342 are disposed between the pole pieces of the bearings 331 and 332, along a cylindrical surface. Opposing pole pieces 200 integrally constructed with a motor 20, are arranged along a series of pole pieces associated with the bearings 331 and 332, as well as the stator rims 341 and 342. The disks 51, 52, 53 and 54 serve to support the preceding parts. These supporting disks are all constructed of nonmagnetic material.

The magnetic flux induced within the coils 31 and 32, is directed along a closed path wherein the flux passes through the cylindrical air space La and to the stator rims 341 and 342, continues from there across the pole pieces 200 of the rotor 20 and toward the internal bearings 331 and 332, and returns to the coil housing 10 by way of the stator shaft 3 and the inner air space Li.

The speed of the rotor is determined by the frequency of the excitation current through the coils 31 and 32. The rotational speed of the sensing head or body 4 immersed within the fluid 41 corresponds, therefore, to the rotational speed of the rotor shaft 2. Depending upon the viscosity of the fluid 41, a greater or smaller retarding or braking torque will be applied to the sensing head. This braking torque, applied to the sensing head through the action of the fluid thereon, is transmitted to the stator shaft 3, to which an indicator 5 is secured. The indicator 5 operates in conjunction with a spiral ring 50 which tends to maintain the indicator and hence the stator shaft in their designated null posiiton. Accordingly, the torque transmitted to the stator shaft 3, actuates the indicator 5 against the action of the spiral spring 50. The indicator 5 is movable along a path including a calibrated scale 13. Depending upon the viscosity of the fluid 41, the indicator 5 will assume a specific position along the scale 13. For purposes of convenience, the scale may be directly calibrated in terms of viscosity units, and the viscosity indication may be read directly through the transparent window 12.

While the invention has been illustrated and described as embodied in measuring devices for taking viscosity measurements, it is not intended to be limited to the details shown, since various modifications and structural changes may be made without departing in any way from the spirit of the present invention.

Without further analysis, the foregoing will so fully reveal the gist of the present invention, that others can, by applying current knowlege, readily adapt it for various applications without omitting features that, from the standpoint of prior art, fairly constitute essential characteristics of thet generic or specific aspects of this invention.

What is claimed as new and desired to be secured by Letters Patent is:

1. A measuring device for measuring a predetermined parameter through measurement of a braking torque comprising, in combination, stator and rotor means mounted rotatably within said device; stationary coil means producing a magnetic field linking said rotor and stator means when energized by an electrical current, said coil means normally remaining stationary during measurement; means for supplying an alternating current to said coil means to cause rotation of said magnetic field and consequent rotation of said rotor means; sensing means secured to said rotor means, said braking torque being applied to said sensing means to resist rotation thereof and thereby being transmitted to said stator through reactive torque coupling; and indicating means secured to said stator means for indicating the measured value of said parameter in correspondence to angular rotation of said stator means responding to said braking torque, whereby the angular rotation of said stator means and said indicating means is a function of the magnitude of said braking torque.

2. A measuring device as defined in claim 1, including a fluid surrounding said sensing means for measuring the viscosity of said fluid.

3. A measuring device as defined in claim 2, wherein said data is a retarding torque applied by said fluid to said sensing means for measuring the viscosity of said fluid.

4. A measuring device as defined in claim 3, including means for guiding said magnetic field so that said retarding torque applied to the rotor is exerted upon the stator through said magnetic field.

5. A measuring device as defined in claim 1, wherein said rotor means is rotatably mounted within said stator means.

6. A measuring device as defined in claim 1 including means for driving said rotor means at substantially constant speeds.

7. A measuring device as defined in claim 1 including a scale associated with said indicating means and calibrated in terms of the values of the parameter being measured.

8. A measuring device as defined in claim 1 including spring means opposing the rotational motion of said stator means and said indicating means.

9. A measuring device as defined in claim 1 including stationary conductors connected to said coils for providing the same with excitation current.

10. A measuring device as defined in claim 1 including pole pieces intergrally formed with said stator means and rotor means and coupled with said magnetic field.

References Cited

UNITED STATES PATENTS

| | | | |
|---|---|---|---|
| 2,574,973 | 11/1951 | Hughes | 73—59 |
| 3,162,038 | 12/1964 | Roberson et al. | 73—59 |
| 3,316,754 | 5/1967 | Nagatsuka et al. | 73—59 |

FOREIGN PATENTS 691,025  5/1953  Great Britain.

LOUIS R. PRINCE, *Primary Examiner.*

J. W. ROSKOS, *Assistant Examiner.*